United States Patent [19]

Tidwell

[11] 3,746,113
[45] July 17, 1973

[54] MOTORCYCLE

[76] Inventor: Hubert Tidwell, Box 57, Wellington, Utah 84542

[22] Filed: July 6, 1971

[21] Appl. No.: 159,744

[52] U.S. Cl.............. 180/32, 180/26 A, 180/33 R, 280/275, 280/304
[51] Int. Cl............................................ B62k 19/04
[58] Field of Search...................... 180/26 A, 30, 31, 180/32, 33 R, 33 A, 34, 35; 280/263, 270, 272, 275, 283, 286, 293, 304

[56] References Cited
UNITED STATES PATENTS

| 3,642,083 | 2/1972 | Rodler | 180/31 |
| 841,624 | 1/1907 | Caughell | 280/272 |
| 3,045,772 | 7/1962 | Nicolai | 180/31 |
| 3,521,904 | 7/1970 | Sheffer | 180/32 X |
| 432,124 | 7/1890 | Duryea | 280/275 |
| 647,789 | 4/1900 | Anderson | 280/263 X |

FOREIGN PATENTS OR APPLICATIONS

| 79,225 | 1/1895 | Germany | 280/283 |
| 1,149,611 | 7/1957 | France | 280/283 |
| 570,420 | 2/1933 | Germany | 280/304 |
| 466,068 | 10/1951 | Italy | 180/33 R |

Primary Examiner—Leo Friaglia
Assistant Examiner—Leslie J. Paperner
Attorney—B. P. Fishburne, Jr.

[57] ABSTRACT

A lightweight motorcycle particularly useful for rough terrain cross-country travel by sportsmen and the like. The vehicle features a hinged two-section spring frame and low pressure balloon tires on cantilevered axles. Both wheels of the vehicle are powered from a centrally located engine. A pair of spring-loaded adjustable foot rests on the front frame section are also useful in braking and steering on rough ground and can form a stand for the vehicle at rest.

4 Claims, 8 Drawing Figures

Patented July 17, 1973  3,746,113

INVENTOR
HUBERT TIDWELL

BY B.P. Fishburn, Jr.

ATTORNEY

Patented July 17, 1973
3,746,113
2 Sheets-Sheet 2
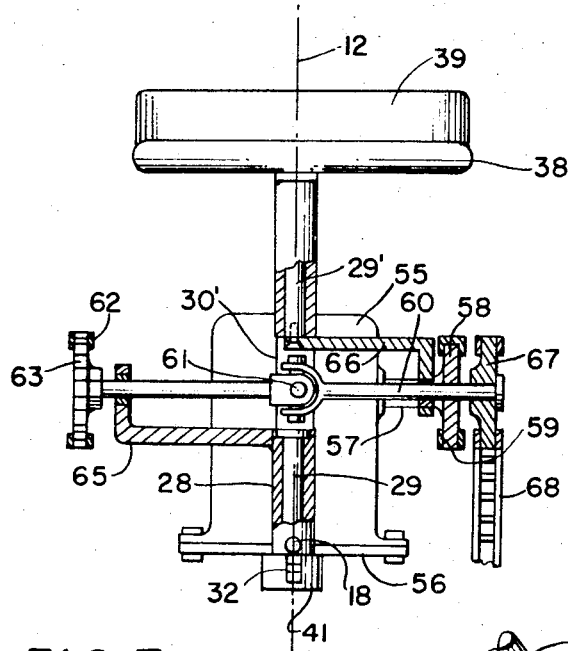
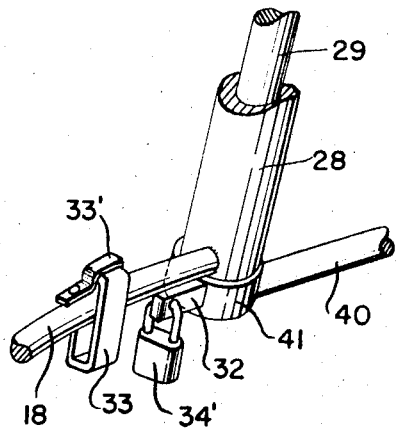
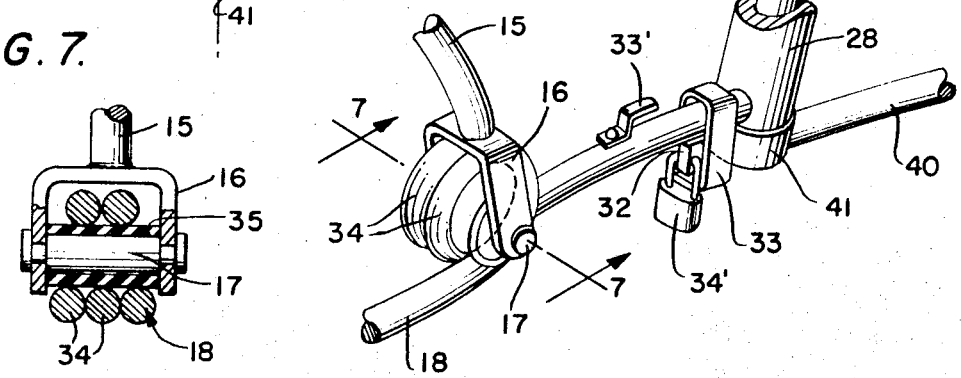
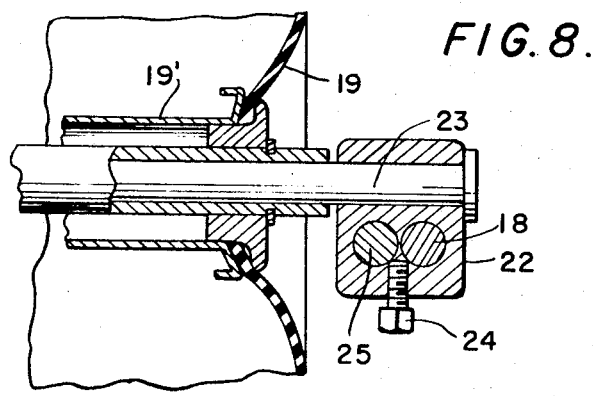
INVENTOR
HUBERT TIDWELL
BY
ATTORNEY

MOTORCYCLE

The invention arises as a result of a need for an inexpensive, simplified, lightweight motorcycle which will facilitate travel on very rough terrain or country having no well defined trails. Such cross-country traveling is becoming increasingly popular by outdoor enthusiasts of all types. Conventional motorcycles are designed for operation on paved roads and highways and are unsuited for rough terrain cross-country travel, being much too heavy and not sufficiently resilient for this usage. In recent years, a variety of forms of motor scooters have appeared on the market but none of these is suited to rough cross-country travel.

Accordingly, the objective of the invention is to provide a motor vehicle which will satisfy the above need in the form of an extremely lightweight, two-wheeled motorcycle which can be carried by the user when necessary to bridge certain obstacles. At the same time, the vehicle possesses sufficient ruggedness and durability to travel on rough unpaved terrain and to provide relative comfort in so doing. It employs extremely low pressure balloon tires which are mounted on simplified opposing cantilevered axles, in turn mounted on the two frame sections of the cycle. The vehicle frame has integral springs which render the vehicle highly resilient and extremely strong material is employed for the lightweight frame. Power for the front and rear wheels is provided by a small engine and simplified gearing.

Other features and advantages of the invention will become apparent during the course of the following detailed description.

BRIEF DESCRIPTION OF DRAWING FIGURES

FIG. 4 is an enlarged fragmentary cross section taken on line 4—4 of FIG. 1.

FIG. 5 is a fragmentary perspective view of a frame locking means.

FIG. 6 is a similar view of the locking means in an active position and showing a portion of the front frame section and spring.

FIG. 7 is a cross section taken on line 7—7 of FIG. 6.

FIG. 8 is an enlarged fragmentary cross section taken on line 8—8 of FIG. 1.

DETAILED DESCRIPTION

Figure 1:
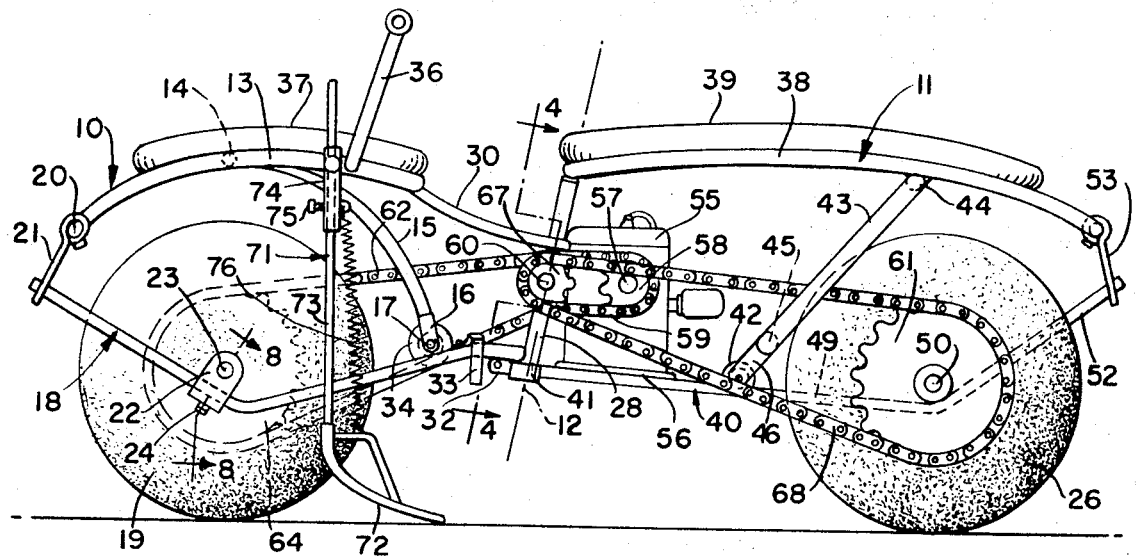
FIG. 1 is a side elevation of a motorcycle embodying the invention.

Referring to the drawings in detail, wherein like numerals designate like parts throughout, the motorcycle comprises front and rear frame sections 10 and 11 which are hingedly connected for relative pivotal movement on a generally vertical but slightly inclined axis 12.

As will be described, both frame sections 10 and 11 have built-in resiliency which increases the ability of the vehicle to traverse the rough country-side. The front frame section 10 includes an upper arcuate relatively rigid portion 13 directly above the front wheel of the motorcycle and in the form of a generally rectangular closed loop, FIG. 2, having a cross brace 14 directly over the front wheel axle. An arcuate bar 15 is attached to the center of the brace 14 and extends downwardly at the rear of the front wheel and terminates at its lower end in a fork 16, FIG. 6.

The front frame section 10 further embodies a spring bar 18 shaped into a shallow V-formation, FIG. 1, and extending close to one side of the front wheel 19 of the vehicle. A short lateral extension 20 on the forward end of frame portion 13 projects over the front end of spring bar 18 and is connected thereto by a preferably flexible snubber strap 21 or the like. This enables the elements 13 and 18 to move together freely and limits their separation to the extended length of the strap element 21.

Near its mid point, the spring bar 18 has mounted thereon an adjustable bracket 22 or bearing for supporting one end of a cantilevered axle 23 upon which the wheel 19 is journaled in a conventional manner. This wheel, as well as the rear wheel of the vehicle, is of the type employing an extremely low pressure (approximately 1 ½ p.s.i.) balloon tire surrounding a central hub structure 19', FIG. 8. In effect, except for the slender axle structure, the wheel 19 is virtually all air and very soft and provides a very wide tread for stability, traction and safety. Such a wheel as may be employed in the invention is shown in U.S. Pat. No. 3,542,145 and a further detailed description of the wheel structure should not be required herein.

The aforementioned bracket 22 is clamped adjustably to the spring bar 18 by a set screw 24, and referring to FIG. 8, this set screw wedges between the bar 18 and a short back-up bar section 25 welded to the inner side of the bar 18 at this locality.

Because of the breadth of the wheel 19 and its softness, it may be adequately supported at one end of the axle 23 through the bracket 22 in cantilevered fashion. The bar 18 functions as a torsion spring to resist twisting forces caused by the rise and fall of the front wheel 19 and this is a unique feature of the invention allowing the use of but a few simplified parts in comparison to conventional wheel mounting structures commonly found on motorcycles. In effect, the front wheel 19 is resiliently held so as to resist movement in any direction caused by irregularities in the ground. It may rise and fall independently of the rear wheel and may twist and tilt laterally from the vertical in either direction.

Rearwardly of the front wheel 19, the spring bar 18 extends somewhat upwardly and is attached to the lower end portion of a generally vertical but slightly rearwardly inclined tubular bar 28 which receives through its bore shaft sections 29 and 29', FIG. 4. As shown in FIG. 4, the tubular bar 28 is interrupted near its middle to provide space for certain mechanism but may be connected or braced at 30' on opposite sides of the mechanism, to be described. The hinge joint between frame sections 10 and 11 is formed by the rotary engagement of shaft sections 29 and 29' inside of tubular bar 28 which is rigidly joined with the front frame section 10. This structure also constitutes a long sturdy bearing between the front and rear frame sections at the region carrying the greatest load. Another longitudinal frame bar 30 interconnects the rear end of frame loop or portion 13 with the upper portion of the tubular bar 28.

A radially projecting lug 32 on the shaft 29 and turning therewith relative to the front frame section 10 when hinging action occurs is adapted to be aligned vertically with the spring bar 18 when the two frame sections 10 and 11 are straightaway. At this time, a slidable locking loop 33 held by a spring clip 33' on the bar 18 may be shifted over the rigid lug 32 so as to lock the frame sections 10 and 11 against pivoting or hinge action relative to one another. A padlock 34' may be applied as shown in the drawings at this time. The arrangement is useful in preventing theft of the vehicle since it cannot be steered and it facilitates a rightful user carrying the vehicle over an obstacle or the like without having the two hinged frame sections move in an unwieldy manner.

Rearwardly of the front wheel 19 and between this wheel and the bar 28, the spring bar 18 is provided with integral spring coils 34 for the additional resilient suspension of the front wheel and for the general comfort of the rider. A short axle element 17, FIG. 7, is received through the coils 34 and the fork 16 straddles the spring coils and is connected to the ends of the axle element 17 as shown. A rubber-like sleeve 35 surrounds the axle 17 to prevent metal-to-metal contact with the spring coils, noise and vibration.

Steering handle bars 36 are rigidly connected to the opposite sides of frame loop 13 near the rear thereof. A seat member 37 for a front rider may be provided atop the frame loop 13, if desired. In lieu of this auxiliary seat, a suitable support for articles may be included on the front frame section such as a basket or luggage rack. In some cases, these elements may be omitted entirely from the structure for simplicity and economy.

The rear portion of the motorcycle formed by frame section 11 embodies a top slightly curved generally horizontal frame loop 38 forming a support for a main elongated seat 39 of sufficient size to accommodate two riders, if necessary.

A rear spring bar 40 similar to the bar 18 has its forward end secured rigidly to a fitting 41 on the bottom end of shaft 29. From this point, the spring bar 40 extends rearwardly at the lateral center of the vehicle and at a point near the longitudinal center of the seat 39 and slightly forwardly of the rear wheel 26. At this point, the spring bar is formed into coils 42 similar to the forward coils 34 and imparting a high degree of resiliency to the rear frame section of the cycle. An inclined brace loop 43 has its upper rear end rigidly secured to the sides of the top frame loop 38 as at 44, and the bottom of this loop 43 forms a transverse foot rest 45 for a rider on the seat 39. Below the foot rest portion 45 on the loop 43 is a depending forked extension 46 which straddles the spring loops 42 and is pivotally connected therewith in the identical manner shown in FIG. 7 in connection with the forked extension 16 and spring loops 34.

Figure 2:
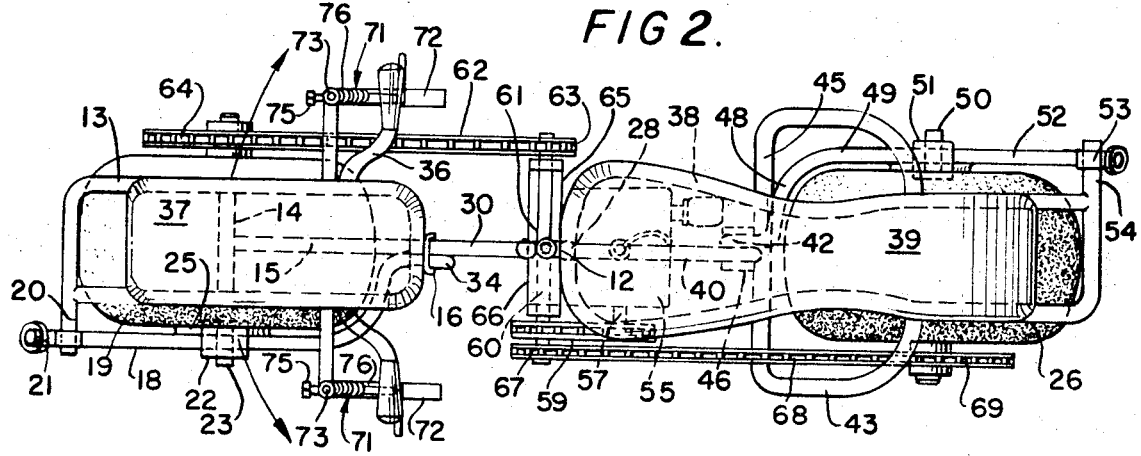
FIG. 2 is a top plan view of the motorcycle.
Figure 3:
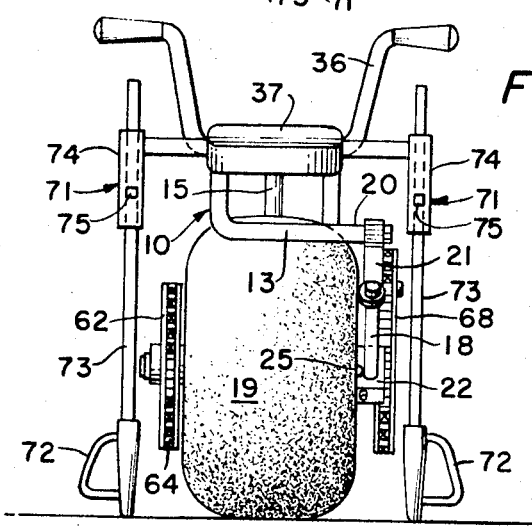
FIG. 3 is a front elevation thereof.

The spring bar 40 extends laterally, FIG. 2, from the loops or coils 42 as indicated at 48 close to the forward side of rear wheel 26. From this point, the spring bar extends rearwardly as a longitudinal extension 49 close to one side of the rear wheel. It will be noted that the spring bar extension 49 is on the opposite side of the rear wheel 26 from the position occupied by the bar 18 relative to the front wheel. This provides a balanced support and a torsion bar suspension for the front and rear wheels, enabling the motorcycle to operate efficiently along hillsides. It can also be appreciated that the arrangement of the spring suspension bars 18 and 40 leave space available at the opposite sides of the wheels 19 and 26 for drive gearing to be described for powering the cycle.

The rear wheel 26 which may be identical in construction to the front wheel 19 has a slender axle 50 identical to the axle 23 and this shaft is supported at one end only in a bracket 51 attached to the adjacent bar extension 49 in the identical manner shown in FIG. 8 with relation to the bracket 22 and the elements 18, 24 and 25. Hence the rear wheel 26 is cantilevered from the rear spring bar 40 in the same manner that the front wheel is cantilevered from the spring bar 18 but in the opposing direction. The arrangement provides a torsion bar suspension, as described, and the rear spring coils 42 absorb shocks in the vertical direction and enables the rear wheel 26 to rise and fall. Thus, the front and rear wheels of the motorcycle are independently suspended resiliently on their respective frames 10 and 11 for any combination of movements or deviations necessary on rough cross-country terrain.

Rearwardly of the axle 50, the spring bar 40 slopes upwardly at 52 for connection through a flexible snubber strap 53 with a short lateral extension 54 on the rear of frame loop 38. The element 53 functions in the same manner as the strap element 21 to allow relative movement between the frame loop 38 and bar portion 52 toward each other but positively limiting their separation.

The motorcycle is powered by a lightweight engine 55 mounted upon a platform portion 56 of the rear frame section 11. The engine crankshaft 57 drives pulley means or sprocket gear 58 which in turn through a belt or chain 59 drives a transverse shaft 60 including two sections connected by a universal joint 61 whose swivel axis is coincident with the pivot axis 12 defined by shaft sections 29 and 29'. Another transmission chain or belt 62 is driven by an element 63 on one end of shaft 60 and extends forwardly close to one side of the front wheel 19 and engages a sprocket gear or pulley 64 on a rotatable part of the wheel structure. Bearing supports 65 and 66 for the two sections of shaft 60 on opposite sides of the universal joint are attached, respectively, to tubular bar 28 and shaft section 29' as shown in FIG. 4. By this arrangement, one section of the drive shaft 60 pivots about the axis 12 with the front frame section 10 while the other section of shaft 60 pivots about the axis 12 with the rear frame section 11.

Power is delivered to the rear wheel 26 from a sprocket gear of pulley 67 on the shaft 60 and a chain or belt 68 which drivingly engages a sprocket gear or pulley 69 of the rear wheel 26. Thus, both wheels of the motorcycle are simultaneously powered by the engine 55 and the power is applied to the opposite sides of the two wheels as shown most clearly in FIG. 2.

Conventional engine and transmission controls, not shown, and conventional wheel brakes of a type well-known in the art, are included in the structure. These conventional controls may be in part associated with the handle bars 36 and may be positioned to be engaged by the feet. Since they are conventional they need not be shown in the drawings. Regarding brakes and clutch, it should be understood that the lightweight simplified cycle is much easier to control and stop than heavier conventional motorcycles.

The motorcycle additionally comprises on opposite sides thereof and near the rear of the front wheel 19 a pair of adjustable stabilizers 71 which serve several important functions. These assemblies include at their lower ends foot rests 72 which also serve as scuff runners during movement of the vehicle and stabilizing stands when the vehicle is stationary. The elements 72 are carried by vertically adjustable shafts 73 which telescope within tubes 74 on the front frame section 10, and are locked in the desired positions by set screws 75. Retractile springs 76 or the like are provided on the assemblies 71 to bias the same upwardly at all times. When the set screws 75 are loosened, the springs 76 are strong enough to elevate the elements 72 and 73 and support the feet and legs of a rider while on the seat 39. When the rider approaches a stop with the vehicle, he can transfer his weight to the elements 72 which will then be lowered into engagement with the ground to add a final drag braking effect. This is a safety factor in case of skids or spin-outs with the very lightweight vehicle and is also a feature which can aid in steering by contact with the ground during cross-country riding. The shaft 73 may be locked in a down position by the set screws 75 to provide a stabilizing stand for the vehicle at rest. Likewise, the shaft 71 may be locked at a relatively high elevation by the set screws while riding at relatively high speeds over-land, assuring that the elements 72 will not contact the ground at these times. It may now be understood that the two assemblies 71 are quite versatile in their usage and, with some practice, the rider will learn to employ them with good results particularly on rough terrain in the foot steering of the lightweight vehicle. On the other hand, the vehicle may be built without the attachment assemblies 71, if preferred, and these may be replaced by simple fixed foot rests on the front frame section 10 and a conventional kick stand.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A motorcycle comprising front and rear frame sections which are articulated on a generally vertical axis near the middle of the motorcycle, each frame section including a lower resilient wheel suspension bar, front and rear wheels for the motorcycle including axle members, means for attaching the axle members to said resilient wheel suspension bars with the axle members supported at one end only in cantilevered relation with respect to said bars, an engine on one of said frame sections, driving connecting means between the engine and said front and rear wheels, said resilient wheel suspension bars of the front and rear frame sections being offset in opposite lateral directions and said axle members being cantilevered from said bars in opposite directions, said bars serving as torsion springs for the front and rear wheels of the motorcycle and also resisting forces on the wheels in a vertical direction, and said wheel suspension bars each having integral transverse axis spring coils formed therein to resiliently resist said forces in a vertical direction.

2. The structure defined by claim 1, and a pair of vertically adjustable and lockable foot rest members and being engageable with the ground during operation of the motorcycle to facilitate maneuvering it on rough terrain.

3. The structure of claim 1, and said spring coils of the forward suspension bar disposed rearwardly of the front wheel and said spring coils of the rear suspension bar disposed forwardly of the rear wheel.

4. The structure of claim 3, and means forming a flexible connection between the forward and rear extremities of said forward and rear suspension bars and substantially rigid parts of said front and rear frame sections.

* * * * *